United States Patent
Ross et al.

(10) Patent No.: US 7,670,277 B2
(45) Date of Patent: Mar. 2, 2010

(54) COMPOSITION AND METHOD FOR THE SOLIDIFICATION OF TOXIC OR HAZARDOUS DRILLING AND AGRICULTURAL WASTE

(75) Inventors: Alan A. Ross, Arva (CA); Dave Kotloski, Carpentersville, IL (US); Giovanni Occhipinti, Katy, TX (US)

(73) Assignee: Amcol International Corporation, Hoffman Estates, IL (US)

( * ) Notice: Subject to any disclaimer, the term of this patent is extended or adjusted under 35 U.S.C. 154(b) by 230 days.

(21) Appl. No.: 11/867,460

(22) Filed: Oct. 4, 2007

(65) Prior Publication Data

US 2009/0093665 A1  Apr. 9, 2009

(51) Int. Cl.
*B09C 1/00* (2006.01)
(52) U.S. Cl. ..................................... 588/256
(58) Field of Classification Search .............. 588/255, 588/252, 256; 175/66
See application file for complete search history.

(56) References Cited

U.S. PATENT DOCUMENTS

| | | | | | |
|---|---|---|---|---|---|
| 4,880,468 A | * | 11/1989 | Bowlin et al. | ............... | 106/706 |
| 4,913,585 A | * | 4/1990 | Thompson et al. | ...... | 405/129.25 |
| RE34,041 E | * | 8/1992 | Doan | ............................. | 588/9 |
| 5,277,519 A | * | 1/1994 | Nahm | ...................... | 405/129.3 |
| 5,430,237 A | * | 7/1995 | Sharp | ......................... | 588/252 |

FOREIGN PATENT DOCUMENTS

JP   49084961 A1 * 10/1972

* cited by examiner

*Primary Examiner*—John Kreck
(74) *Attorney, Agent, or Firm*—Marshall, Gerstein & Borun LLP

(57) ABSTRACT

A method of solidifying toxic or hazardous liquid waste, including the steps of pumping an aqueous waste, e.g., from a drilling fluid holding area; through a shearing device; adding the layered phyllosilicate to said aqueous waste in an amount sufficient to solidify the aqueous waste sufficiently such that the solidified aqueous waste has no free liquid; shearing the pumped aqueous waste, containing said layered phyllosilicate, sufficiently to partially exfoliate the layered phyllosilicate into phyllosilicate platelets and tactoids while in contact with the aqueous waste; pumping the sheared aqueous waste and layered phyllosilicate to a solidification area; and allowing the sheared aqueous waste and partially exfoliated layered phyllosilicate sufficient time to solidify such that there are no free liquids remaining in the solidified waste.

17 Claims, No Drawings

COMPOSITION AND METHOD FOR THE SOLIDIFICATION OF TOXIC OR HAZARDOUS DRILLING AND AGRICULTURAL WASTE

FIELD OF THE INVENTION

The present invention is directed to compositions containing a layered phyllosilicate or a combination of a layered phyllosilicate and a superabsorbant polymer, such as a polyacrylate; methods of manufacturing the compositions; and methods of using the compositions for solidifying hazardous and/or toxic liquids, particularly drilling fluid wastes, invert drilling fluid wastes, and agricultural wastes to pass regulatory mandated analytical tests in a minimal amount of time.

BACKGROUND OF THE INVENTION

Drilling waste management is one of the most important challenges in the petroleum industry. The used drilling mud and cuttings result in a substantial ecological contamination problem after drilling is completed. The main pollution of cuttings is caused by biocides; oil; completion or stimulation fluid components; corrosion inhibitors; reservoir fluids (crude oil, brine); inorganic cations and anions, and drilling mud chemical components. The compositions and methods described herein are effective for solidification and remediation of drilling muds and cuttings containing any or all of these pollutants; and agricultural wastes containing animal excrement and/or agricultural fertilizer run off.

The current way of drilling waste management remains somewhat crude from the ecological point of view. The drilling wastes are mainly collected in tanks or pits near the drilling rig and sometimes, after some initial treatment, are either dumped or buried when drilling is halted or mixed with the nearby ground soil and buried.

One of the most popular methods of drilling waste treatment is solidification and stabilization. If a pollutant is below the allowed limit, drilling waste can be solidified in place. Cement and silica are the most popular agents. Von Krosigk U.S. Pat. Nos. 6,835,697; 6,809,067; and published application US 2002/169082 A1 and 2002/169084 A1 disclose adding a number of materials to the drilling waste in a high shear mixer, particularly a solidification agent, such as calcium oxide, Portland cement or an ash product, together with a cellulose additive and a cell transport additive, such as an electrolyte enzyme. The cementing technique encapsulates the contaminants and minimizes the mobility of the contaminants out of the resulting encapsulated drilling waste material, and cements the contaminants in place.

Other solidification materials include dehydrated limestone; coke ash (U.S. Pat. No. 7,059,805); Portland cement and spherical zeolite (U.S. 2005/133222); fly ash (U.S. Pat. No. 5,383,521); and blast furnace slag (U.S. Pat. No. 5,058,679). The solidifying additives require at least eight (8) hours to achieve sufficient solidification to pass a critical Paint Filter Test (US EPA 9095B) and the US EPA Toxic Characteristic Leachate Procedure (US EPA 1311), that is used to determine that the solidified waste will not release contaminated liquid. These solidifying additives also require a much higher percentage of additives and, therefore, add significantly more mass and weight to the contaminated material resulting in more costly/and fill disposal.

Solidifying liquid drilling waste has tremendous benefits for oilfield drilling applications, environmental safety/clean up applications, and drilling companies. The benefit for environmental safety is that it can confine permanently most heavy/toxic metals and some toxic organics inside a solid matrix. Therefore, heavy metal ions and organic toxic and/or hazardous compounds will not leach out and cause environmental issues on local land and water. For oilfield drilling applications, replacing liquid waste with solid waste results a huge economical benefit. A significant portion of the drilling costs is in remediation of the sites and disposing of the waste generated during drilling operations. About 20-30% of the drilling cost is currently used for waste disposal because the drilling companies' costs are extremely high when expensive vacuum trucks are required to haul the liquid wastes away to far-away landfill sites. Much less expensive dump modes of transport can be used if the waste is in solid form so long as the solid waste passes the Paint Filter Liquids Test (PFT). Additionally, the solid waste can even be disposed of locally if it passes the Toxicity Characteristic Leach Procedure (TCLP), which further reduces the cost of waste disposal. The benefit for environmental safety is that it can permanently fixate heavy/toxic metals and the majority of toxic organics inside the solid matrix. Therefore, heavy metal ions and organic toxic compounds will not leach out and cause environmental issues in local non-hazardous land fills.

Another benefit of this invention is the solidification of the liquid wastes with the layered phyllosilicate and superabsorbent polymer allows the evaporation of water from the solidified waste. By allowing the evaporation of water, two benefits are realized. First, the volume and mass of the solid waste reduces and this reduces the transportation volume and cost. Second, the contaminants of concern are less likely to leach out of the solidified solid waste as the water evaporates as the solidification becomes tighter.

SUMMARY

The products and methods described herein are designed to solidify many different liquid drilling wastes and agricultural wastes. Compared to other solidifying agents currently on the market, the products described herein have the following advantages, among others: fast reaction time; high adsorption capability for heavy metals and organics; and low cost since only 2-5 wt % material, based on the weight of the waste, is used in the preferred embodiment. It has been found that one or more phyllosilicates, or a combination of one or more phyllosilicates and a superabsorbent polymer, can permanently fixate heavy/toxic metals and toxic/hazardous organic pollutants inside a solid layered phyllosilicate, e.g., a smectite (montmorillonite) clay or a combination of a layered phyllosilicate and a superabsorbent polymer.

Typical reduction in total waste after addition of the phyllosilicate-containing materials described herein is over 30% by weight. The advantages of the products described herein come from their main or sole component: a layered phyllosilicate that is capable of absorbing at least four times, preferably at least five times, its weight in water. The layered phyllosilicate is added to the drilling or agricultural waste material in an amount sufficient to provide a solid waste product that has no free liquid, as tested in accordance with EPA test method 9095B Revision 2, November 2004.

Layered phyllosilicates, such as montmorillonites, are composed of units made of two silica tetrahedral sheets connected by an alumina octahedral sheet or platelet. The atoms common to both the tetrahedral and octahedral layers are oxygen atoms. The uniqueness of its structure is that some of $Al^{3+}$ ions in the octahedral sites are replaced by $Mg^{2+}$ ions, causing net negative charges for these 3-layered sheets. In order to balance these charges, metal cations are sitting between these platelets. These inter-layer cations are usually Na⁺, Mg²⁺, or Ca²⁺ ions. Due to the nature of the electrostatic interaction between these inter-layer cations and the platelets, these inter-layer cations are relatively free to move around between the platelets and can also be exchanged by other cations. Another outstanding feature of the montmorillonite structure is that water or other polar molecules, such as certain organic molecules or surfactants, can enter between the sheets. This causes the solid lattice to expand in the direction perpendicular to the sheets and, together with shearing, the individual platelets are exfoliated into individual platelets and tactoids that the contaminants are electrostatically affixed to.

Any water swellable layered silicate (phyllosilicate) material may be used in the practice of this invention. Useful swellable phyllosilicates include smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered silicate materials, particularly for admixture with a sodium smectite clay, include micaceous minerals, such as illite and mixed layered illite/smectite minerals, such as rectorite; tarosovite, ledikite and admixtures of illites with the clay minerals name above. Preferred swellable layered silicate materials are phyllosilicates of the 2:1 type having a negative charge on the layers ranging from about 0.15 to about 0. charges per formula unit and a commensurate number of exchangeable metal cations in the interlayer spaces. Most preferred layered materials are smectite clay minerals such as montmorillonite, nontronite, beidellite, volkonskoite hectorite, saponite, sauconite, sobockite, stevensite, and svinfordite, particularly the layered materials that have sodium as a predominant exchangeable cation.

Solidification Mechanism and Test Results

Phyllosilicate particles, e.g., montmorillonite particles, consist of thousands of ultra-thin aluminum silicate sheets that are highly hydrophilic and are held together by movable metal cations which are also hydrated in water. Therefore, montmorillonite particles have a strong tendency and capability to absorb and/or adsorb a large amount of water between the sheets. Sodium bentonite clay, having sodium as its most prevalent interlayer cation, can usually absorb 500%-700% (w/w) of water to become a soft solid. The reason that sodium bentonite can hold so much water is due to the fact that the sodium cation (Na⁺) is very easily hydrated so that water can enter the expandable sheet structures, between adjacent clay platelets, easily.

Another important property of montmorillonite clay is its ion-exchange property. The hydrated sodium cation (Na⁺) has a very large radius and low charge density. Therefore, it can be easily exchanged by other bivalent and trivalent metal cations including toxic heavy metal cations (Hg²⁺, Ba²⁺, Cd²⁺, Cr³⁺, Pb²⁺, and the like). These heavy metal cations are less hydrated in water (small hydrated ion radius) and have a higher positive charge density than sodium. Therefore, once they replace the sodium cations (Na⁺) and bind tightly to the negatively charged clay platelets, it is very difficult for the heavy metal ions to be released. As a result, these heavy metal ions are removed from the liquid waste and confined inside the phyllosilicate tactoids or held to the surface of the exfoliated phyllosilicate platelets, permanently.

The optional water-absorbing polymeric component of the compositions described herein are termed "superabsorbent polymers" or "SAPs", and typically are lightly cross-linked hydrophilic polymers. SAPs are available in a variety of chemical forms, including substituted and unsubstituted natural and synthetic polymers, such as hydrolysis products of starch acrylonitrile graft polymers, carboxymethylcellulose, crosslinked polyacrylates, sulfonated polystyrenes, hydrolyzed polyacrylamides, polyvinyl alcohols, polyethylene oxides, polyvinylpyrrolidones, and polyacrylonitriles. The most commonly used SAP for absorbing electrolyte-containing aqueous fluids, such as urine, is neutralized, lightly cross-linked polyacrylic acid, e.g., containing about 50% and up to 100%, neutralized carboxyl groups, as well known in the art of diaper manufacture.

SAPs are generally discussed in Goldman et al. U.S. Pat. Nos. 5,669,894 and 5,599,335, each incorporated herein by reference. SAPs can differ in their chemical identity, but all SAPs are capable of absorbing and retaining amounts of aqueous fluids equivalent to many times their own weight, even under moderate pressure. For example, SAPs can absorb one hundred times their own weight, or more, of distilled water.

As used herein, the term "SAP particles" refer to superabsorbent polymer particles in the dry state, i.e., particles containing from no water up to an amount of water less than the weight of the particles. The term "particles" refers to granules, fibers, flakes, spheres, powders, platelets, and other shapes and forms known to persons skilled in the art of superabsorbent polymers. The terms "SAP gel" and "SAP hydrogel" refer to a superabsorbent polymer in the hydrated state, i.e., particles that have absorbed at least their weight in water, and typically several times their weight in water.

SAP particles can differ in ease and cost of manufacture, chemical identity, physical properties, rate of water absorption, and degree of water absorption and retention, thus making the ideal water-absorbent resin a difficult compound to design. For example, the hydrolysis products of starch-acrylonitrile graft polymers have a comparatively high ability to absorb water, and are SAPs, as defined herein.

SAP particles typically are polymers of unsaturated carboxylic acids or derivatives thereof. These polymers are rendered water insoluble, but water swellable, by crosslinking the polymer with a di- or polyfunctional internal crosslinking agent. These internally crosslinked polymers are at least partially neutralized and contain pendant anionic carboxyl groups on the polymer backbone that enable the polymer to absorb aqueous fluids. Typically, the SAP particles are subjected to a post-treatment to crosslink the pendant anionic carboxy groups on the surface of the particle.

SAPs are manufactured by known polymerization techniques, preferably by polymerization in aqueous solution by gel polymerization. The products of this polymerization process are aqueous polymer gels, i.e., SAP hydrogels, that are reduced in size to small particles by mechanical forces, then dried using drying procedures and apparatus known in the art. The drying process is followed by pulverization of the resulting SAP particles to the desired particle size.

EXPERIMENTAL

The drilling wastes were treated with 2% by weight of a mixture containing 75% sodium bentonite clay and 25% sodium polyacrylate superabsorbent polymer (PitDry™ by blending the drilling water and the solidification agents under high shear. The solidified material passed the US EPA paint filter test within 15 minutes and passed the TCLP leachable BTEX and TCLP leachable metals. Testing results of drilling sites in Alberta, Canada are listed below in Tables 1 and 2.

TABLE 1

TCLP Leachable Metals (ALS Laboratory Group, Alberta, Canada) of multiple drilling sites containing drilling wastes of Conoco-Phillips at Alberta, Canada.

|  | Results (mg/L) | Detection Limit (mg/L) |
|---|---|---|
| Mercury (Hg) | <0.01 | 0.01 |
| Silver (Ag) | <0.01 | 0.01 |
| Boron (B) | ≦0.2 | 0.2 |
| Barium (Ba) | ≦0.5 | 0.5 |

TABLE 2

TCLP Leachable BTEX (ALS Laboratory Group, Alberta, Canada) of multiple drilling sites containing drilling wastes of Conoco-Phillips at Alberta, Canada.

|  | Results (mg/L) | Detection Limit (mg/L) | Regulation Requirement (mg/L) |
|---|---|---|---|
| Benzene | <0.005 | 0.005 |  |
| Toluene | <0.005 | 0.005 |  |
| Ethylbenzene | <0.005 | 0.005 |  |
| Xylenes | <0.005 | 0.005 |  |

Dehydration and Rehydration

After solidification, the soft solid waste will continuously dehydrate at a rate that is similar or slightly accelerated compared to the untreated liquid waste. The increased surface area of the drying sludges, as a result of the addition of phyllosilicate, significantly increases the drying rate of the sludge. The total weight loss of the solidified wastes will be similar to the untreated liquid waste during the same time period and same ambient temperature since only 3-5 wt % PitDry™ products will not increase the total weight of the wastes.

With the accelerated dehydration and the low addition rate of less than 10% by weight preferably less than 5% by weight e.g. about 1% to about 5% by weight, preferably about 1% to about 4% by weight of a sheared phyllosilicate or phyllosilicate-superabsorbant polymer combination, based on the weight of the waste material, the resulting weight of the sludge (drilling waste and solidification composition) is significantly lower than the original weight of the sludge.

The rehydration process for the solid wastes is slow under mild or no mechanical mixing condition (e.g., rain). Using sodium bentonite products one can quickly absorb the water in the drilling waste and transfer the liquid waste into a soft solid. Due to the high water volume absorption capability, only a small amount of the phyllosilicate-containing solidification composition, e.g., about 1% to about 10% by weight (typically 1-4 wt %) based on the weight of the waste is needed to solidify the wastes. The time required for solidification sufficient to pass the paint filter test depends on the mixing process, the amount of solidification composition added, and the composition of the waste; but it usually happens within 10 to 20 minutes and a couple of hours maximum. Advantageously, due to the time needed to completely solidify the contaminated liquid into a non-leaching solid, the viscosity is initially low enough so that the sheared liquid/phyllosilicate/optimal superabsorbant solidification compositions described herein can be easily pumped to a solidification area after the contaminated drilling waste and clay are sheared together.

Solidification test results show the contaminated drilling waste in a beaker and after adding 3 wt % sodium montmorillonite clay (based on the weight of the liquid drilling waste) to the drilling waste and shearing for 1 hour at room temperature, the waste was solidified on the dish and passed Paint Filter Liquids Test (PFT) 9095B. Lower addition rates can be achieved by adding the phyllosilicate to the drilling waste in a high shear mixing process first by taking on water inside their expanded/swelled platelets, which delays further penetration of water into the cores of the solids. Any components of the waste trapped inside the solid previously, such as chloride salts, will not be rehydrated and leach out. The exchanged heavy metal ions and toxic and/or hazardous organic molecules will not leach out because they are tightly bound to the negative phyllosilicate platelets.

Using a shear mixer, the powdered smectite clay can be mixed with liquid waste on the drilling site in one step. The solidification time is usually minutes and a couple of hours maximum depending on temperature of waste specifics after mixing.

What is claimed:

1. A method for solidification of an aqueous waste material containing heavy metals or hazardous organic contaminants comprising mixing a layered phyllosilicate consisting of a water swellable smectite clay, into said aqueous waste material in an amount sufficient to solidify the aqueous waste material sufficiently such that the solidified aqueous waste material has essentially no free liquid, as determined by the solidified aqueous waste material passing the Paint Filter Liquids Test, EPA Method 9095B;

shearing the aqueous waste material, containing said layered phyllosilicate, sufficiently to partially exfoliate the layered phyllosilicate into phyllosilicate platelets and tactoids while in contact with the aqueous waste material; and pumping the sheared wasted material to a solidification area or transport vehicle for solidification.

2. The method of claim 1, wherein the aqueous waste material is a drilling fluid waste material or an agricultural waste material, and the water-swellable layered phyllosilicate is mixed into the aqueous waste material in an amount of about 0.1% to about 10% based on the weight of the aqueous waste material.

3. A method for solidification of an aqueous waste material containing heavy metals or hazardous organic contaminants comprising:

adding a layered phyllosilicate to said aqueous waste material in an amount sufficient to solidify the aqueous drilling fluid waste sufficiently, after shearing, such that the solidified aqueous waste material has no free liquid;

shearing the aqueous waste material, containing said layered phyllosilicate, sufficiently to partially exfoliate the layered phyllosilicate into phyllosilicate platelets and tactoids while in contact with the aqueous waste material;

pumping the sheared aqueous waste material and layered phyllosilicate to a solidification area; and allowing the sheared aqueous waste material and partially exfoliated layered phyllosilicate sufficient time to solidify such that there are no free liquids remaining in the solidified waste material, as determined by the solidified aqueous waste material passing the Paint Filter Liquids Test, EPA Method 9095B.

4. The method of claim 3 further including the step of transporting the solidified waste material in an unsealed transport vehicle to a landfill.

5. The method of claim 4, wherein the transport vehicle is a dump truck.

6. The method of claim 3, wherein the aqueous waste material is a drilling fluid waste and the sheared aqueous drilling fluid waste and partially exfoliated layered phyllosilicate is pumped back to the solidification area for solidification.

7. A method for solidification of an aqueous waste material containing heavy metals or hazardous organic contaminants comprising mixing a water-swellable layered phyllosilicate and a superabsorbent polymer into said aqueous waste material in an amount sufficient to solidify the aqueous waste material sufficiently such that the solidified aqueous waste material has essentially no free liquid, as determined by the solidified aqueous waste material passing the Paint Filter Liquids Test, EPA Method 9095B, and shearing the aqueous waste material, containing said water-swellable layered phyllosilicate sufficiently to partially exfoliate the layered phyllosilicate into phyllosilicate platelets and tactoids while in contact with the aqueous waste material.

8. The method of claim 7, wherein the aqueous waste material is a drilling fluid waste material or an agricultural waste material, and the layered phyllosilicate is mixed into the aqueous waste material in an amount of about 0.1% to about 10% based on the weight of the aqueous waste material and the superabsorbant polymer is added in an amount of about 0.1% to about 10% based on the weight of the aqueous waste material.

9. The method of claim 8, wherein the superabsorbent polymer is selected from the group consisting of partially crosslinked polyacrylates, starch acrylonitrile graft polymers, carboxymethylcellulose, sulfonated polystyrenes, hydrolyzed polyacrylamides, polyvinyl alcohols, polyethylene oxides, polyvinylpyrrolidones, polyacrylonitriles, and combinations thereof.

10. The method of claim 9, wherein the superabsorbent polymer is a partially crosslinked polyacrylic acid containing about 50% to about 100% neutralized carboxyl groups.

11. The method of claim 7, including the steps of pumping an aqueous drilling fluid waste from a drilling fluid holding area;
adding the layered phyllosilicate and superabsorbent polymer to said aqueous drilling fluid waste in an amount sufficient to solidify the aqueous drilling fluid waste sufficiently, after shearing, such that the solidified aqueous drilling fluid waste has no free liquid;
shearing the aqueous drilling fluid waste, containing said layered phyllosilicate and superabsorbent polymer, sufficiently to partially exfoliate the layered phyllosilicate into phyllosilicate platelets and tactoids while in contact with the aqueous drilling fluid waste;
pumping the sheared aqueous drilling fluid waste and layered phyllosilicate to a solidification area; and
allowing the sheared aqueous drilling fluid waste, superabsorbent polymer and partially exfoliated layered phyllosilicate sufficient time to solidify such that there are no free liquids remaining in the solidified drilling fluid waste.

12. The method of claim 11 further including the step of transporting the solidified drilling fluid waste in an unsealed transport vehicle to a landfill.

13. The method of claim 11, wherein the transport vehicle is a dump truck.

14. The method of claim 11, wherein the sheared aqueous drilling fluid waste, superabsorbent polymer and partially exfoliated layered phyllosilicate is pumped back to the drilling fluid holding area for solidification.

15. The method of claim 11, wherein the weight ratio of layered phyllosilicate to superabsorbent polymer is in the range of 0.1 to 10.

16. The method of claim 11, wherein the superabsorbant polymer is selected from the group consisting of partially crosslinked polyacrylates, starch acrylonitrile graft polymers, carboxymethylcellulose, sulfonated polystyrenes, hydrolyzed polyacrylamides, polyvinyl alcohols, polyethylene oxides, polyvinylpyrrolidones, polyacrylonitriles, and combinations thereof.

17. The method of claim 15, wherein the superabsorbant polymer is a partially crosslinked polyacrylic acid containing about 50% to about 100% neutralized carboxyl groups.

* * * * *